United States Patent
Iwata et al.

(10) Patent No.: US 10,913,821 B2
(45) Date of Patent: Feb. 9, 2021

(54) POLYMER HAVING ALDARIC ACID AS CONSTITUTIONAL UNIT AND METHOD FOR PRODUCING SAME

(71) Applicants: THE UNIVERSITY OF TOKYO, Tokyo (JP); ENSUIKO SUGAR REFINING CO., LTD., Tokyo (JP)

(72) Inventors: Tadahisa Iwata, Tokyo (JP); Yukiko Rogers, Tokyo (JP); Yuxin Wu, Tokyo (JP); Hisaharu Masaki, Tokyo (JP); Tetsuya Ito, Tokyo (JP); Koji Hara, Tokyo (JP)

(73) Assignees: ENSUIKO SUGAR REFINING CO., LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 93 days.

(21) Appl. No.: 16/088,602

(22) PCT Filed: Mar. 29, 2017

(86) PCT No.: PCT/JP2017/013014
§ 371 (c)(1),
(2) Date: Sep. 26, 2018

(87) PCT Pub. No.: WO2017/170740
PCT Pub. Date: Oct. 5, 2017

(65) Prior Publication Data
US 2019/0100621 A1    Apr. 4, 2019

(30) Foreign Application Priority Data

Mar. 30, 2016 (JP) .................... 2016-068112

(51) Int. Cl.
*C08G 69/28* (2006.01)
*C08G 69/26* (2006.01)
*C08G 63/16* (2006.01)

(52) U.S. Cl.
CPC ............. *C08G 69/28* (2013.01); *C08G 63/16* (2013.01); *C08G 69/26* (2013.01); *C08G 2250/00* (2013.01)

(58) Field of Classification Search
CPC ........ C08G 69/28; C08G 69/26; C08G 63/16; C08G 2250/00
See application file for complete search history.

(56) References Cited

U.S. PATENT DOCUMENTS

| 5,312,967 A | 5/1994 | Kiely et al. |
| 6,156,429 A | 12/2000 | Marcincinova et al. |

(Continued)

FOREIGN PATENT DOCUMENTS

| DE | 60308411 T2 | 12/2006 |
| EP | 1569982 | 9/2005 |

(Continued)

OTHER PUBLICATIONS

Cornelia Rosu et al, "Sugar-Based Polyamides: Self-Organization in Strong Polar Organic Solvents", Biomacromolecules, 16, 2015, pp. 3062-3072.

(Continued)

*Primary Examiner* — Shane Fang
(74) *Attorney, Agent, or Firm* — Greenblum & Bernstein, P.L.C.

(57) ABSTRACT

The present invention relates to a high molecular weight polymer having an aldaric acid as a constitutional unit, and a method for producing the same, and more specifically, relates to a thermoplastic polymer which comprises at least one repeating unit derived from an aldaric acid, and has a weight average molecular weight of 3,800 or more.

8 Claims, 8 Drawing Sheets

(56) References Cited

U.S. PATENT DOCUMENTS

| | | |
|---|---|---|
| 6,894,135 B2 | 5/2005 | Kiely et al. |
| 7,314,906 B2 | 1/2008 | Kiely et al. |
| 2001/0007771 A1 | 7/2001 | Sullivan et al. |
| 2004/0158029 A1 | 8/2004 | Kiely et al. |
| 2006/0264672 A1 | 11/2006 | Andrews et al. |
| 2008/0268013 A1 | 10/2008 | Chaikof et al. |
| 2008/0300383 A1 | 12/2008 | Verdianz et al. |
| 2009/0131259 A1 | 5/2009 | Kiely et al. |
| 2010/0035353 A1 | 2/2010 | Mourier et al. |
| 2014/0348754 A1 | 11/2014 | Wiley et al. |
| 2015/0177238 A1 | 6/2015 | Mourier et al. |

FOREIGN PATENT DOCUMENTS

| | | |
|---|---|---|
| JP | 39-24290 B1 | 10/1964 |
| JP | 6-322066 A | 11/1994 |
| JP | 2001-508815 A | 7/2001 |
| JP | 2002-511113 A | 4/2002 |
| JP | 2006-509092 A | 3/2006 |
| JP | 2008-504410 A | 2/2008 |
| JP | 2008-081411 A | 4/2008 |
| JP | 2008-530307 A | 8/2008 |
| JP | 2008-531790 A | 8/2008 |
| JP | 2010-019837 A | 1/2010 |
| JP | 2011-503331 A | 1/2011 |
| JP | 2014-37479 A | 2/2014 |
| WO | 2004/052958 A1 | 6/2004 |
| WO | 2004/052959 A1 | 6/2004 |
| WO | 2012/001240 A1 | 1/2012 |
| WO | 2014/185964 A1 | 11/2014 |

OTHER PUBLICATIONS

Kiely et al., "Hydroxylated Nylons Based on Unprotected Esterified D-Glucaric Acid by Simple Condensation Reactions", Journal of the American Chemical Society, 116 , 1994, pp. 571-578.

Kiely et al., "Synthetic Polyhydroxypolyamides from Galactaric, Xylaric, D-Glucaric, and D-Mannaric Acids and Alkylenediamine Monomers—Some Comparisons", Journal of Polymer Science Part a—Polymer Chemistry, 38, 2000, pp. 594-603.

International Search Report issued with respect to Patent Application No. PCT/JP2017/013014, dated Jun. 20, 2017.

International Preliminary Report on Patentability issued with respect to Patent Application No. PCT/JP2017/013014, dated Oct. 2, 2018.

Japanese Office Action, Japanese Patent Office, Application No. 2018-509364, dated Jun. 9, 2020, English translation.

Japanese Decision of Rejection issued in JP Pat. Appl. No. 2018-509364, Dec. 22, 2020, English translation.

Kazuhiko Hashimoto et al., "Synthesis and Characterization of Polyamides Containing D-Galactose Derivatives in the Main Chain," Polymer Preprints, Japan, May 12, 1999, vol. 48 No. 2, 293.

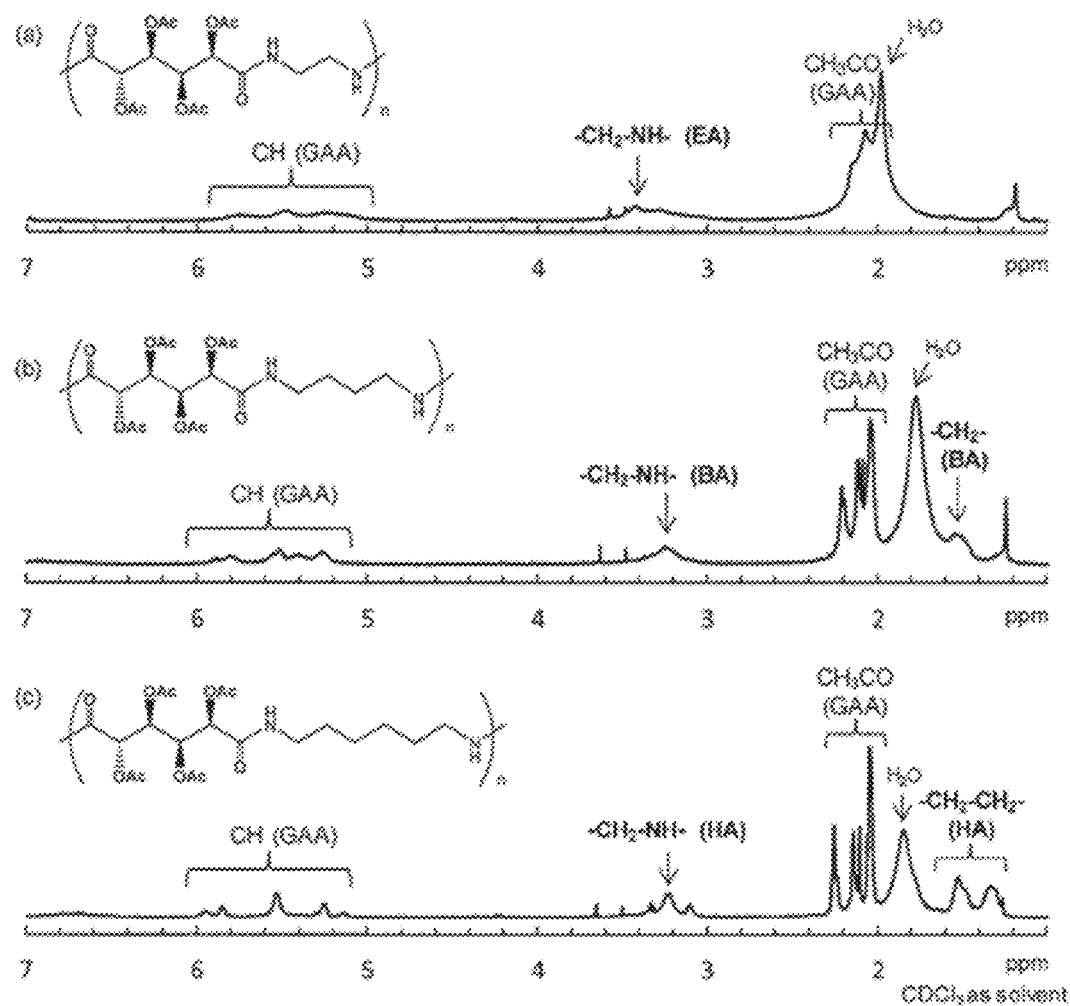
[Fig. 1]

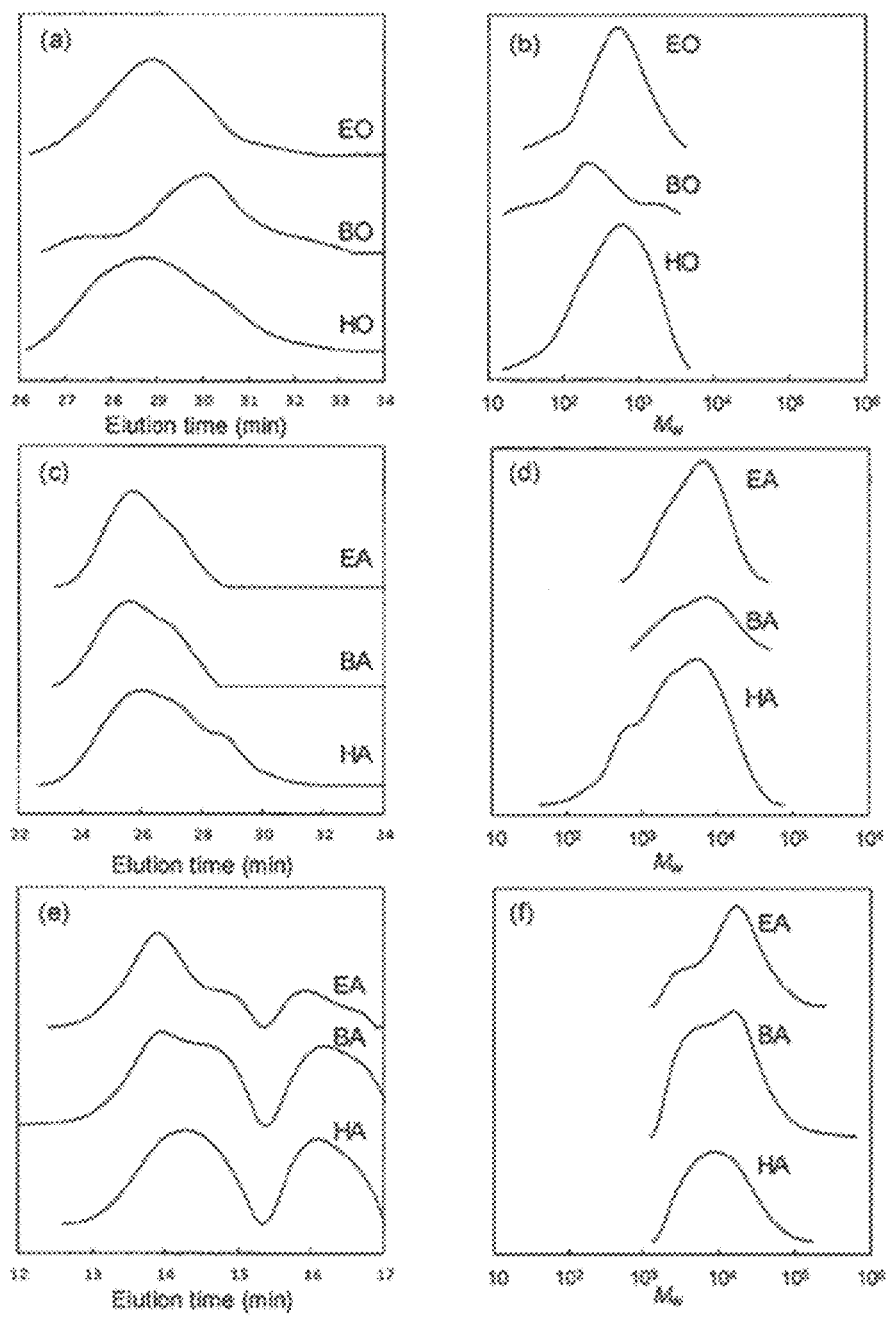
[Fig. 2]

[Fig. 3]
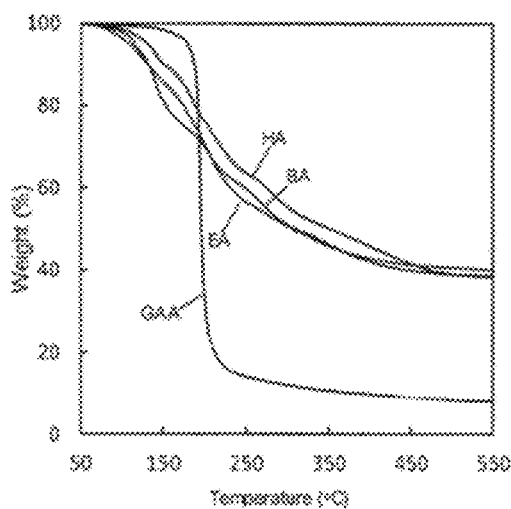
[Fig. 4]
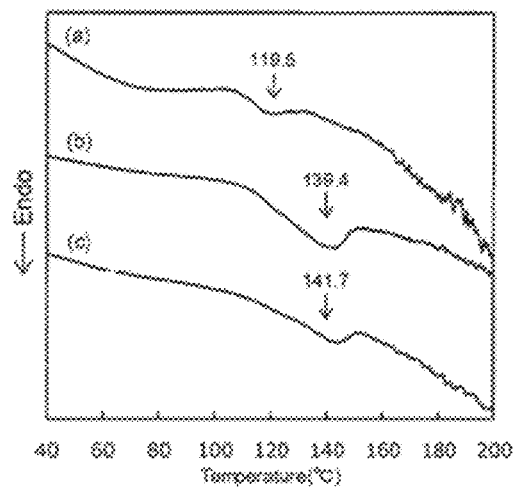

[Fig. 5]
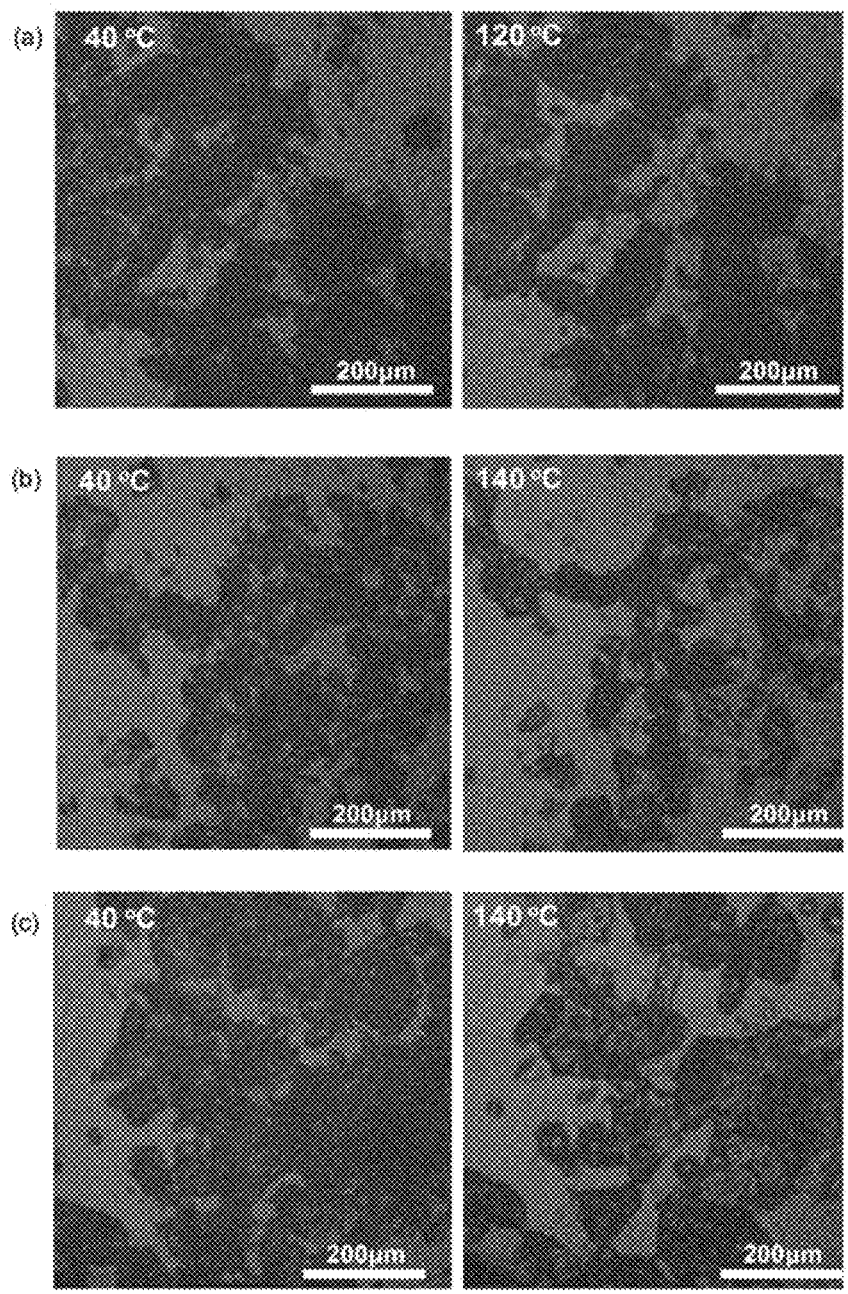

[Fig. 6]
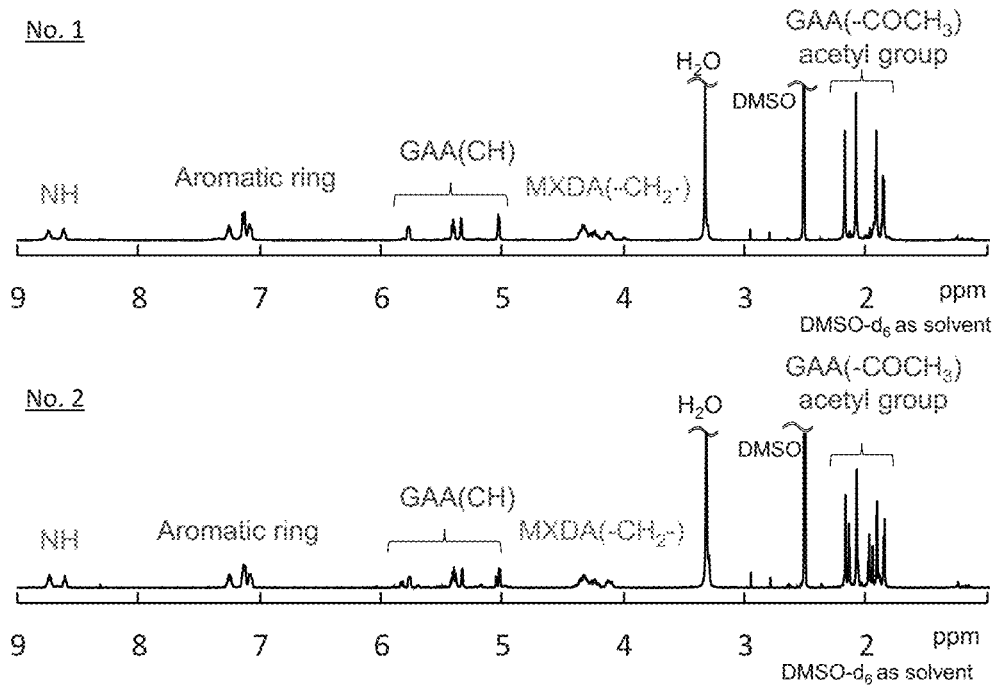
[Fig. 7]
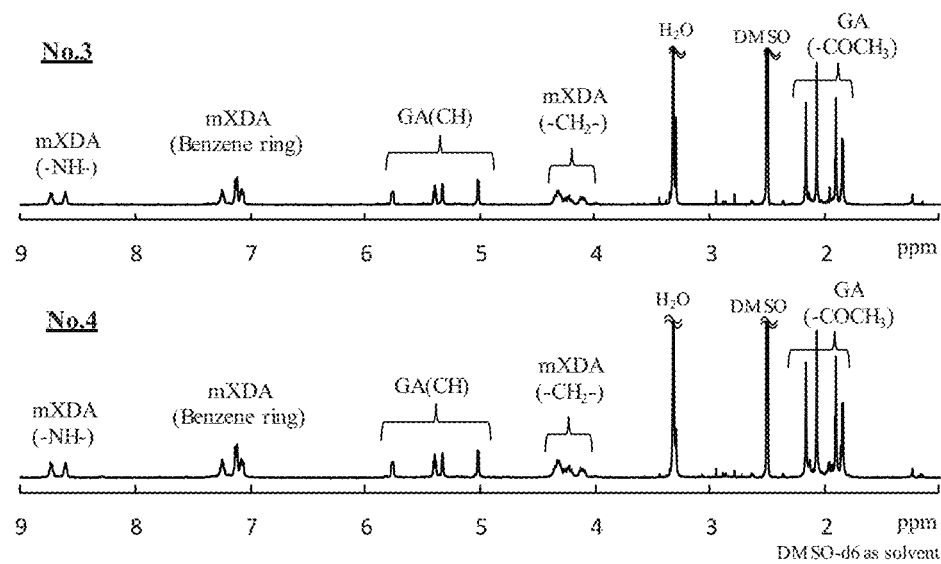

[Fig. 8]
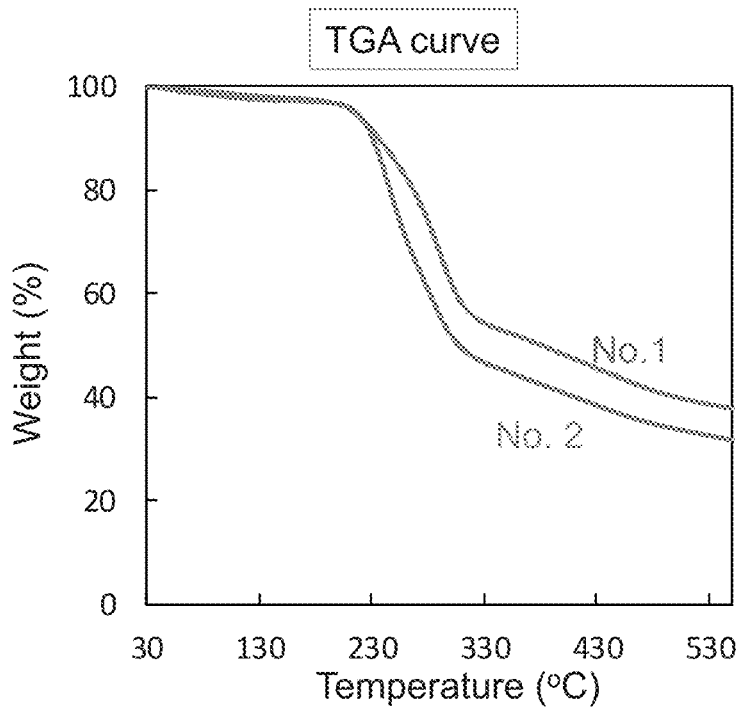
[Fig. 9]
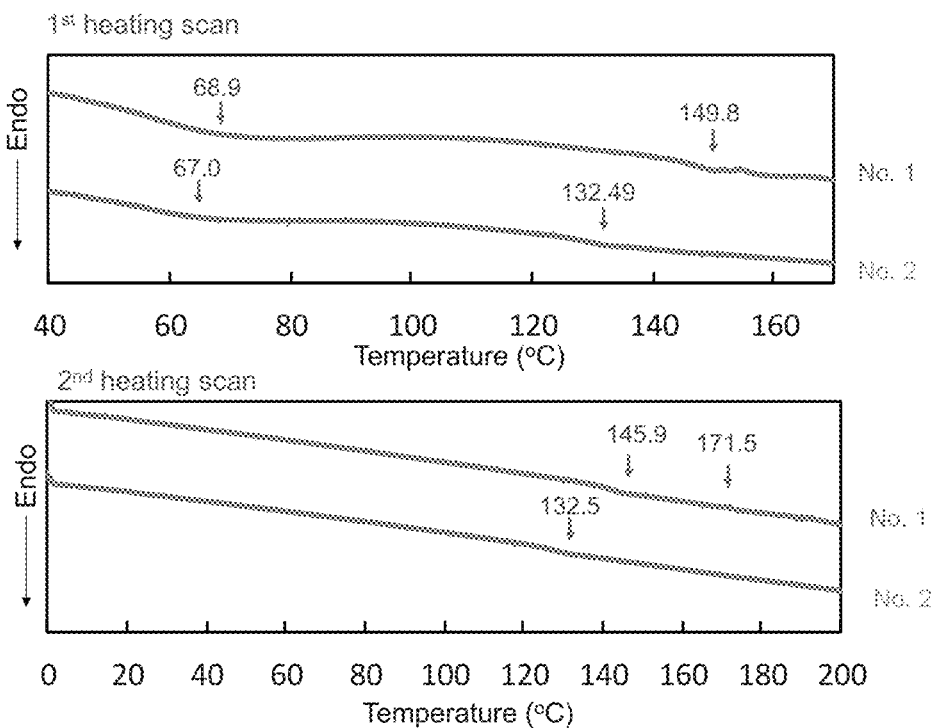

[Fig. 10]
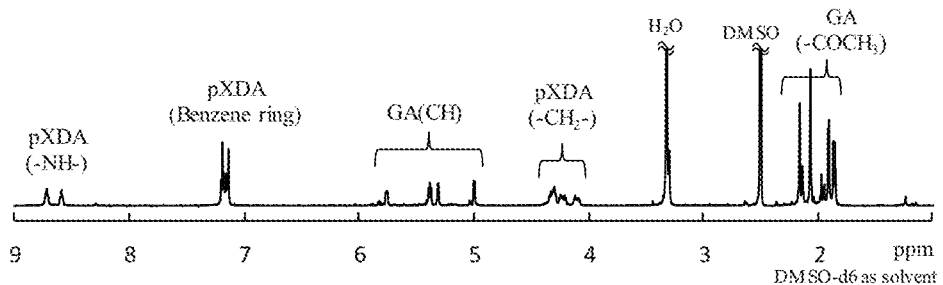
[Fig. 11]
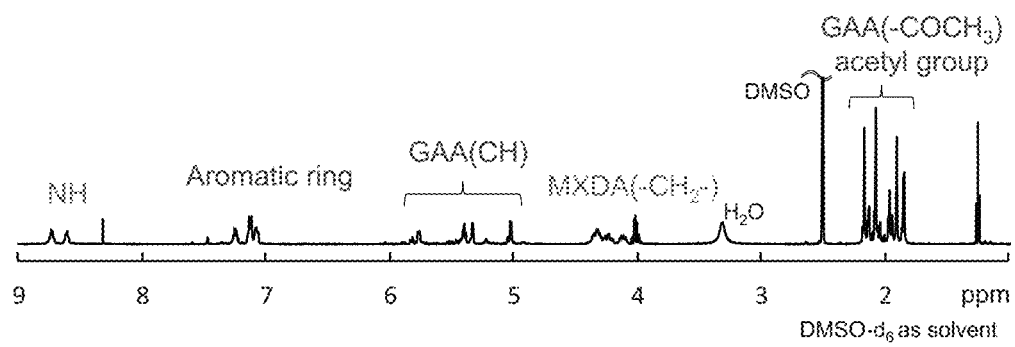
[Fig. 12]
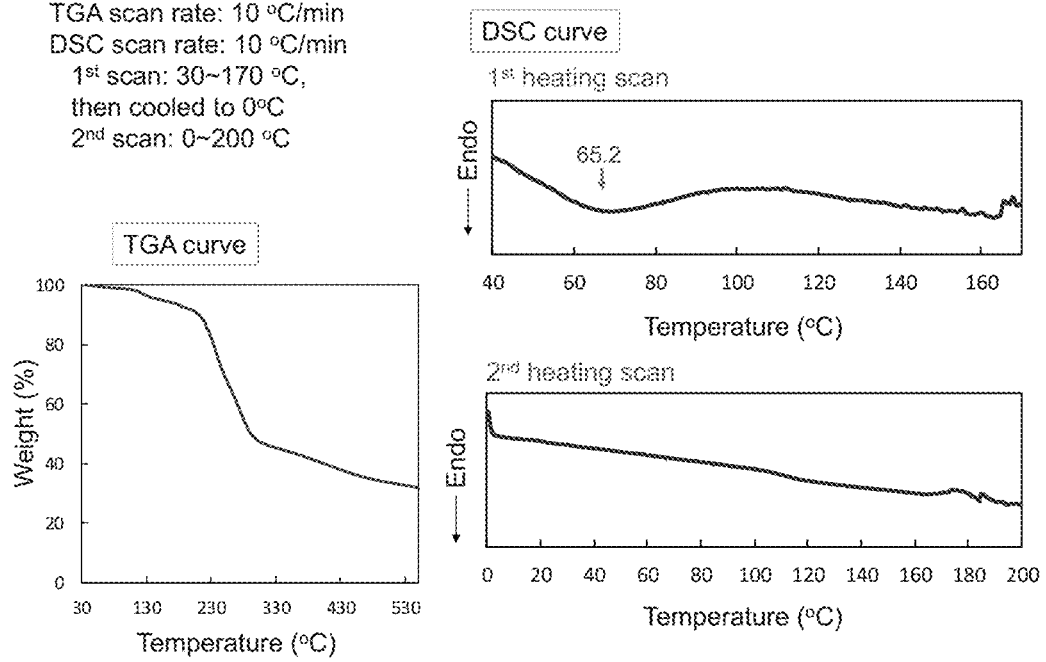

[Fig. 13]
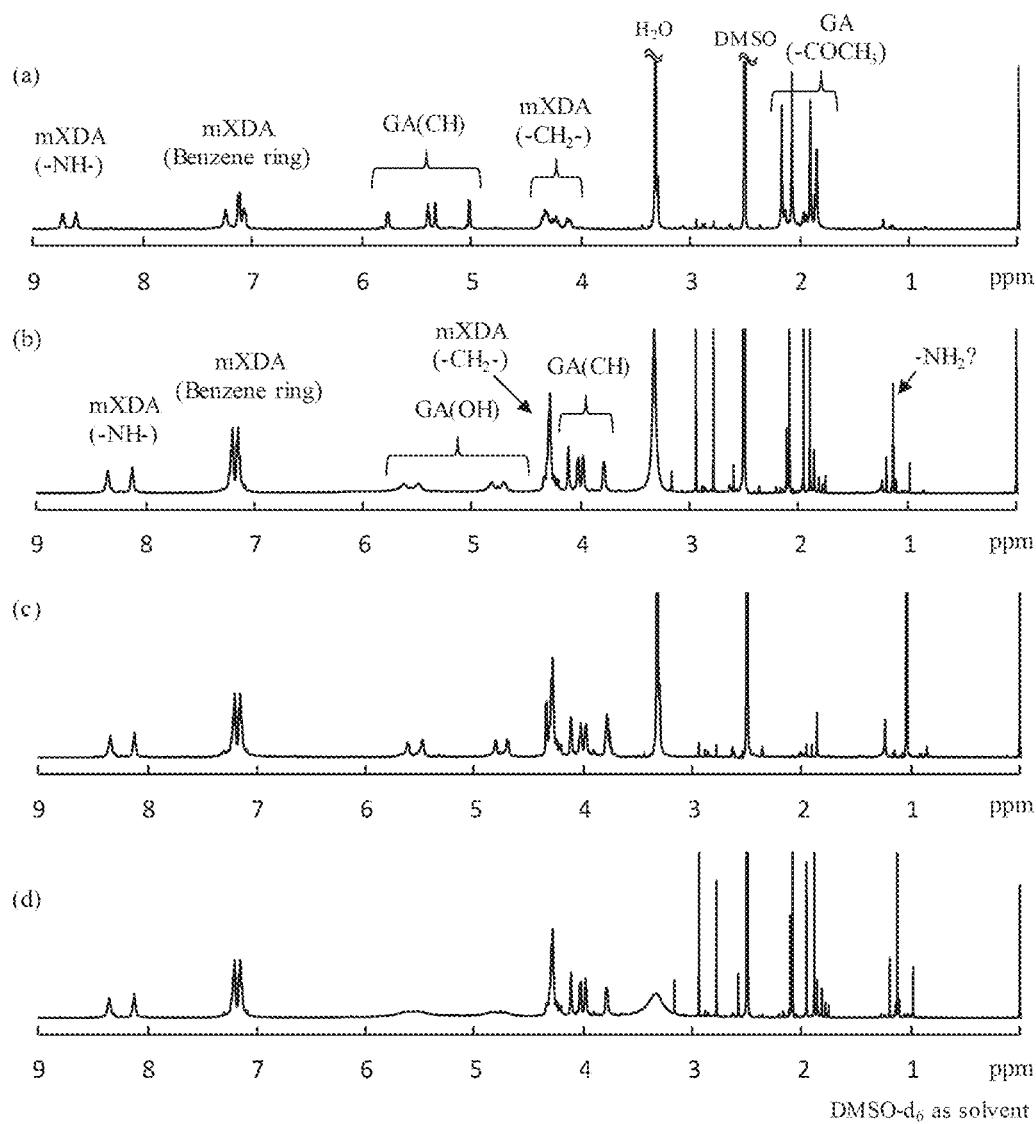
¹H-NMR spectra of (a) GAA-mXDA polyamide and deprotected polyamide by (b) 1.5mL, (c) 2.0ml and (d) 2.5mL 28% ammonia solution

POLYMER HAVING ALDARIC ACID AS CONSTITUTIONAL UNIT AND METHOD FOR PRODUCING SAME

TECHNICAL FIELD

The present invention relates to a polymer having an aldaric acid as a constitutional unit, and a method for producing the same. In particular, the present invention relates to a high molecular weight polymer having an aldaric acid such as glucaric acid, or the like, as a constitutional unit, and a method for producing the same.

BACKGROUND ART

In recent years, from the viewpoint of global warming, and for reasons such as increased waste, a number of problems with plastics have been pointed out repeatedly. Due to these environmental demands, it has become important to replace existing petroleum-based plastics with bio-based plastics made from renewable resource biomass (plant material) as a raw material.

Glucaric acid (GA), both ends of which are carboxyl groups, is a saccharic acid obtained by oxidizing monosaccharides such as glucose and the like, obtained by decomposing cellulose, and is one of 12 kinds of biomass refinery base materials defined by the U.S. Department of Energy. Application to the use of materials such as plastics and the like has not been developed yet, and it is very important to develop novel usage methods.

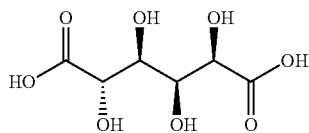 [SMILES: O=C(O)[C@@H](O)[C@@H](O)[C@H](O)[C@@H](O)C(=O)O]

CITATION LIST

Patent Literature

Patent Literature 1: WO 2004/052958
Patent Literature 2: U.S. Pat. No. 6,894,135B2
Patent Literature 3: DE 60308411D1
Patent Literature 4: EP 1569982A1
Patent Literature 5: US 2004/0158029
Patent Literature 6: WO 2004/052959A1

Non Patent Literature

Non Patent Literature 1: Kiely, D. E.; Chen, L.; Lin, T. H., Journal of the American Chemical Society 1994, 116, 571-578.
Non Patent Literature 2: Kiely, D. E.; Chen, L.; Lin, T. H., Journal of Polymer Science Part a-Polymer Chemistry 2000, 38, 594-603.

SUMMARY OF INVENTION

Technical Problem

An object of the present invention is to provide a high molecular weight polymer having an aldaric acid as a constitutional unit, and a method for producing the same.

Solution to Problem

The present inventors have attempted to synthesize a monomer protecting a hydroxyl group of GA and synthesize a polymer by polycondensation thereof, aiming at the development of a polymer material including GA, which is one kind of aldaric acid, as a raw material, succeeded in the synthesis of linear glucaric acid acetate (GAA), and conducted synthesis of polyamide and polyester by copolymerization of GAA and 1,6-hexanediamine (HA) or the like. However, with the conventional methods, there was a problem that the molecular weight of the precipitated product did not exceed 3,800 or more.

Therefore, as a result of studying the synthesis method and post-treatment method, the present inventors have found that the obtained polymer was present in a water-soluble portion and the molecular weight also increased, found a method for efficiently recovering the polymer, and accomplished the present invention.

That is, the present invention provides:
[1] A thermoplastic polymer comprising at least one repeating unit derived from an aldaric acid and having a weight average molecular weight of 3,800 or more;
[2] The thermoplastic polymer according to [1], further comprising at least one repeating unit derived from a diamine or a diol;
[3] The thermoplastic polymer according to [2], comprising at least one repeating unit derived from a diamine;
[4] The thermoplastic polymer according to any one of [1] to [3], wherein the aldaric acid is selected from the group consisting of xylaric acid, arabinaric acid, glucaric acid, mannaric acid, and galactaric acid;
[5] The thermoplastic polymer according to any one of [1] to [4], wherein the thermoplastic polymer has crystallinity;
[6] A method for producing a polymer comprising a repeating unit derived from an aldaric acid, the method comprising:
(i) mixing an aldaric acid or a derivative thereof, and a diamine or a diol in water and a non-polar organic solvent; and
(ii) concentrating a reaction mixture obtained in step (i) under reduced pressure;
[7] The method according to [6], comprising freeze-drying the concentrated reaction mixture; and
[8] The method according to [6] or [7], wherein the non-polar organic solvent is selected from the group consisting of chloroform and dichloromethane.

Advantageous Effects of Invention

According to the present invention, a high molecular weight polymer having an aldaric acid as a constitutional unit can be efficiently produced. Further, according to the present invention, it is possible to provide a high molecular weight thermoplastic polymer having an aldaric acid as a constitutional unit, and it can be expected to be used as a new bio-based plastic.

BRIEF DESCRIPTION OF DRAWINGS

FIG. 1 shows $^1$H-NMR spectra of polyamides obtained in Example 1.
FIG. 2 shows GPC elution curves and molecular weight distributions of polymers obtained in Example 1 and Comparative Examples 1 and 2.

FIG. 3 shows TGA curves of the polyamides obtained in Example 1 (the sample before dialysis is measured as it is in a mixture).

FIG. 4 shows DSC curves of the polyamides obtained in Example 1 (the sample before dialysis is measured as it is in a mixture).

FIG. 5 shows POM images of the polyamides obtained in Example 1 (the sample before dialysis is measured as it is in a mixture).

FIG. 6 shows $^1$H-NMR spectra of polyamides obtained in Example 2.

FIG. 7 shows $^1$H-NMR spectra of the polyamides obtained in Example 2.

FIG. 8 shows TGA curves of the polyamides obtained in Example 2.

FIG. 9 shows DSC curves of the polyamides obtained in Example 2.

FIG. 10 shows a $^1$H-NMR spectrum of a polyamide obtained in Example 3.

FIG. 11 shows a $^1$H-NMR spectrum of a polyamide obtained in Example 4.

FIG. 12 shows a TGA curve and DSC curve of the polyamide obtained in Example 4.

FIG. 13 shows $^1$H-NMR spectra of polyamides obtained in Example 5.

DESCRIPTION OF EMBODIMENTS

An aspect of the present invention is a polymer comprising at least one repeating unit derived from an aldaric acid and having a weight average molecular weight of 3,800 or more, and preferably 4,000 or more.

The polymer of the present invention preferably further comprises at least one repeating unit derived from a diamine or a diol.

Examples of the diamine include aliphatic diamines such as ethylenediamine (EA), 1,4-butanediamine (BA), 1,6-hexanediamine (HA), 1,8-octanediamine, 1,10-decanediamine, and the like, and aromatic diamines such as phenylenediamine, p-xylenediamine, m-xylenediamine, and the like. The diamine is preferably ethylenediamine, 1,4-butanediamine, 1,6-hexanediamine, p-xylenediamine, m-xylenediamine.

Examples of the diol include aliphatic diols such as ethyleneglycol (EG), 1,4-butanediol (BO), 1,6-hexanediol (HA), 1,8-octanediol, 1,10-decanediol, and the like. Preferably, the diol is ethylene glycol, 1,4-butanediol, 1,6-hexanediol.

The aldaric acid is selected from xylaric acid, arabinaric acid, glucaric acid, mannaric acid, or galactaric acid, and is preferably glucaric acid.

In the repeating unit derived from an aldaric acid in the present invention, in addition to the aldaric acid itself as a repeating unit, a derivative of aldaric acid, i.e., an aldaric acid having a hydroxyl group converted into a protecting group, is included as the repeating unit (the hydroxyl group herein does not include an OH group constituting a part of a terminal carboxyl group). Examples of the protecting group of the hydroxyl group include an ester-based protecting group (for example, an acetyl group, a propionyl group, a benzoyl group), an ether-based protecting group (for example, a methyl group, an ethyl group, and a benzyl group), and the like. The protecting group of the hydroxyl group is preferably an acetyl group or a methyl group. Further, deprotection can be performed by a conventional method, and thus "a repeating unit in which a hydroxyl group of an aldaric acid is converted into a protecting group" can be converted into "a repeating unit derived from an aldaric acid itself".

In a preferred embodiment of the present invention, the repeating unit derived from an aldaric acid is a repeating unit derived from glucaric acid acetate.

The polymer of the present invention has a weight average molecular weight of 3,800 or more. Weight average molecular weights of polymers having glucaric acid as a constitutional unit obtained so far were about 2,000, and it was difficult to say that they were a polymer. The present invention achieves a weight average molecular weight of 3,800 or more in the polymer having an aldaric acid as a constitutional unit.

The weight average molecular weight of the polymer of the present invention is generally 3,800 or more, preferably 4,000 or more, more preferably 10,000 or more, and even more preferably 20,000 or more. In addition, the upper limit of the weight average molecular weight is not particularly limited, but it is generally 1,000,000 or less, preferably 350,000 or less, and more preferably 100,000 or less.

Furthermore, the weight average molecular weight is a value measured by gel permeation chromatography (GPC), and polyethylene oxide is used as a standard material.

In addition, the polymer of the present invention shows thermoplasticity. Further, the polymer of the present invention preferably has a melting point and exhibits crystallinity.

Another aspect of the present invention is a method for producing a polymer comprising a repeating unit derived from an aldaric acid, the method comprising: (i) mixing an aldaric acid or a derivative thereof, and a diamine or a diol in water and a non-polar organic solvent; and (ii) concentrating a reaction mixture obtained in step (i) under reduced pressure.

When an aldaric acid or a derivative thereof is reacted with a diamine or a diol by interfacial polymerization of water/organic solvent, the resulting compound is generally precipitated, but the weight average molecular weight of the compound is as low as about 2,000. On the other hand, it is possible to obtain a polymer which is also produced in an organic solvent or water by mixing an aldaric acid or a derivative thereof, and a diamine or a diol in water and a non-polar organic solvent to obtain a reaction mixture (more specifically, a reaction solution) and concentrating the reaction mixture under reduced pressure, preferably while stirring, and the weight average molecular weight of the polymer is a relatively high molecular weight of about 4,000 or more.

In the method for producing a polymer of the present invention, the step (i) is preferably performed in the presence of a basic catalyst. Examples of the basic catalyst include sodium bicarbonate, sodium hydroxide, triethylamine, pyridine, and the like, and sodium bicarbonate is preferred.

The aldaric acid or the derivative thereof, and the diamine or the diol are mixed in water and the non-polar organic solvent, and allowed to stand at room temperature (for example, 10 to 30° C.) for one minute to 10 minutes to perform a reaction. Thereafter, the reaction mixture is transferred to an eggplant flask, or the like, and the reaction mixture is concentrated under reduced pressure with an evaporator while being stirred.

Examples of the diamine include aliphatic diamines such as ethylenediamine, 1,4-butanediamine, 1,6-hexanediamine, 1,8-octanediamine, 1,10-decanediamine, and the like, and aromatic diamines such as phenylene diamine, p-xylenediamine, m-xylenediamine, and the like, and the diamine is preferably ethylenediamine, 1,4-butanediamine, 1,6-hexanediamine, p-xylenediamine, m-xylenediamine.

Furthermore, when the diamine is an aromatic diamine, a polymer comprising a repeating unit derived from an aldaric acid can be produced even by a conventional solution polymerization besides the above-described production method.

Examples of the diol include aliphatic diols such as ethylene glycol, 1,4-butanediol, 1,6-hexanediol, 1,8-octanediol, 1,10-decanediol, and the like. The diol is preferably ethylene glycol, 1,4-butanediol, 1,6-hexanediol.

The aldaric acid is selected from xylaric acid, arabinaric acid, glucaric acid, mannaric acid, or galactaric acid, and is preferably glucaric acid.

The derivative of aldaric acid means an aldaric acid having a hydroxyl group converted into a protecting group (the hydroxyl group herein does not include an OH group constituting a part of a terminal carboxy group). Examples of the protecting group of the hydroxyl group include an ester-based protecting group (for example, an acetyl group, a propionyl group, and a benzoyl group), an ether-based protecting group (for example, a methyl group and an ethyl group), and the like. The hydroxyl-protecting group is preferably an acetyl group or a methyl group. Further, deprotection can be performed by a conventional method. For example, by performing deprotection on the polymer after the synthesis, "a repeating unit in which a hydroxyl group of an aldaric acid is converted into a protecting group" can be converted into "a repeating unit derived from an aldaric acid itself".

Further, the hydroxyl group constituting a part of the carboxy group at the terminal is preferably substituted with chlorine or the like in order to increase reactivity with the diamine or the diol.

In a preferred embodiment of the present invention, the derivative of aldaric acid is glucaric acid chloride acetate.

A molar ratio of aldaric acid or derivative thereof to diamine or diol is generally 1:1.

The non-polar organic solvent is preferably a solvent having a specific gravity higher than that of water. Examples thereof include chloroform, dichloromethane, and the like.

One aspect of the method for producing the polymer of the present invention comprises freeze-drying the concentrated reaction mixture. Even when the organic solvent is removed by concentration under reduced pressure, the polymer may not be precipitated in some cases. In this case, all of the product can be recovered by freeze-drying the remaining water.

When the concentrated reaction mixture is freeze-dried to obtain a polymer, a monomer may be contained in the obtained product in some cases. In order to separate and purify the polymer in the product, it is preferable to perform dialysis.

EXAMPLES

Hereinafter, the present invention is described by Examples, but the present invention is not limited thereto.
(1) Raw Material
A glucaric acid potassium salt was provided by Ensuiko Sugar Refining Co., Ltd. As other reagents, commercially available reagents were used without purification.
(2) Synthesis of Glucaric Acid Acetate
Glucaric acid acetate was synthesized according to Scheme 1 below.

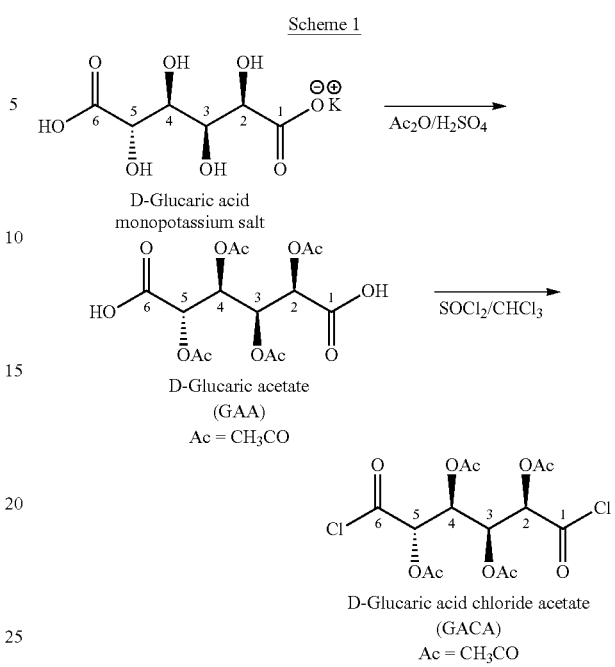

Scheme 1

D-Glucaric acid monopotassium salt

D-Glucaric acetate (GAA)
Ac = CH$_3$CO

D-Glucaric acid chloride acetate (GACA)
Ac = CH$_3$CO

D-glucaric acid potassium salt (10 g) was dispersed in acetic anhydride (10 ml) at room temperature, and then a concentrated sulfuric acid (50 ml) was added at 60° C. The solution became transparent after a few minutes, and was stirred for 3 hours. The mixture was extracted with chloroform/acetone (v/v=7:3) and water. The organic phase was dried over Na$_2$SO$_4$ and concentrated to dryness. Pure water was added and freeze-dried to obtain colorless solid glucaric acid acetate (GAA) (3.0 g, 30% yield).

$^1$H-NMR (CDCl$_3$): δ 2.07 (s, 3H, CH$_3$CO at C4), 2.08 (s, 3H, CH$_3$CO at C3), 2.15 (s, 3H, CH$_3$CO at C5), 2.19 (s, 3H, CH$_3$CO at C2), 5.22 (d, 1H, J$_{4,5}$=4.65, C5-H), 5.37 (d, 1H, J$_{2,3}$=3.90, C2-H), 5.60 (dd, 1H, J$_{4,5}$=4.65, J$_{4,3}$=6.22, C4-H), 5.81 (dd, 1H, J$_{3,2}$=3.90, J$_{3,4}$=6.22, C3-H), 6.9 (broad s, C1OOH and C6OOH). $^{13}$C-NMR (CDCl$_3$): δ 20.31 (CH$_3$CO at C2), 20.36 (CH$_3$CO at C5), 20.42 (CH$_3$CO at C3) 20.46 (CH$_3$CO at C4), 69.20 (C3), 69.66 (C5), 69.81 (C4), 70.15 (C2), 169.73 (CH$_3$CO at C5), 170.07 (CH$_3$CO at C3), 170.14 (CH$_3$CO at C4), 170.19 (C6), 170.21 (C1), and 170.47 (CH$_3$CO at C2). 10% and 50% decomposition temperature T$_{d10\%}$=187.5° C., and T$_{d50\%}$=195.5° C.
(3) Synthesis of Glucaric Acid Chloride Acetate (GACA)
Glucaric acid chloride acetate was synthesized according to Scheme 1 above.
To a solution of GAA (1.0 g, 2.6 mmol) in chloroform, thionyl chloride (1.2 mlm, 16.5 mmol) was added at room temperature. The reaction mixture was stirred at 50° C. for 3 hours and then concentrated to obtain galacturonic acid chloride acetate (GACA). This product was used for polymerization without purification.

Comparative Example 1

Solution Polymerization of GAA-Based Polyester
Solution polymerization of the GAA-based polyester was performed according to the top of Scheme 2 below.

Scheme 2: Solution polymerization of GACA with diamine or diol

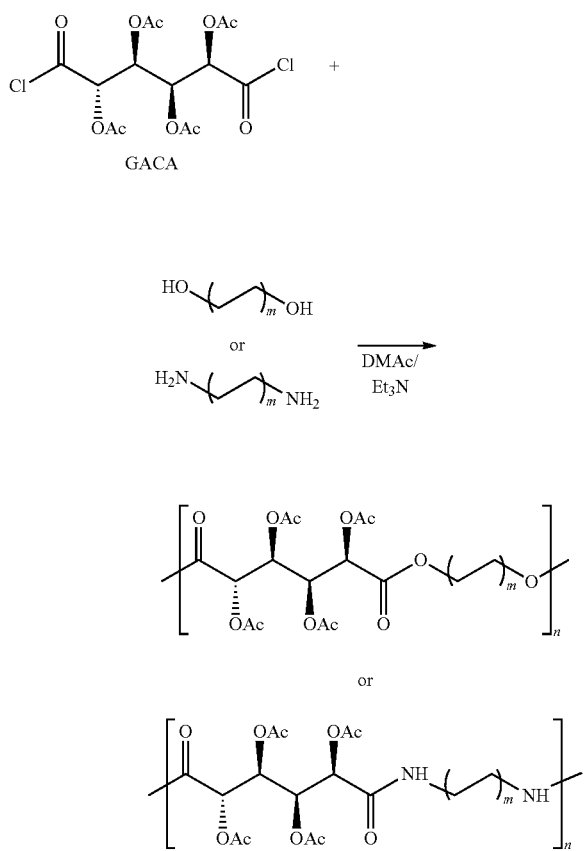

To a solution of ethylene glycol (EO, m=1) (147 μL, 2.6 mmol) and triethylamine (TEA) (734 μL, 2.6 mmol) in dimethylacetamide (DMAc) (5.0 mL), a solution of GACA (ca. 1.0 g, 2.6 mmol) in DMAc (0.5 ml) was added dropwise. The reaction mixture was stirred overnight. The solution was concentrated to obtain a crude product of polyester.

Other polyesters were synthesized using 1,4-butanediol (BO, m=2) (234 μL, 2.6 mmol) and 1,6-hexanediol (HO, m=3) (312 mg, 2.6 mmol).

Comparative Example 2

Solution Polymerization of GAA-Based Polyamide

Solution polymerization of the GAA-based polyamide was performed according to the bottom of Scheme 2 below.

To a solution of ethylenediamine (EA, m=1) (176.4 μL, 2.6 mmol) and TEA (734 μL, 5.3 mmol) in DMAc (5.0 ml), a solution of GACA (ca. 1.0 g, 2.6 mmol) in DMAc (5.0 ml) was added dropwise. The reaction mixture was stirred overnight. The solvent was removed by an evaporator and freeze-dried to obtain a crude product of polyamide.

Other polyamides were synthesized using 1,4-butanediamine (BA, m=2) (265 μL, 2.6 mmol) and 1,6-hexanediamine (HA, m=3) (365 μL, 2.6 mmol). A molecular weight of the polyamide was measured by GPC without purification.

Example 1

Synthesis of GAA-Based Polyamide by Interfacial Polymerization

Interfacial polymerization of the GAA-based polyamide was performed according to Scheme 3 below.

Scheme 3: Interfacial polymerization of GACA and diamine

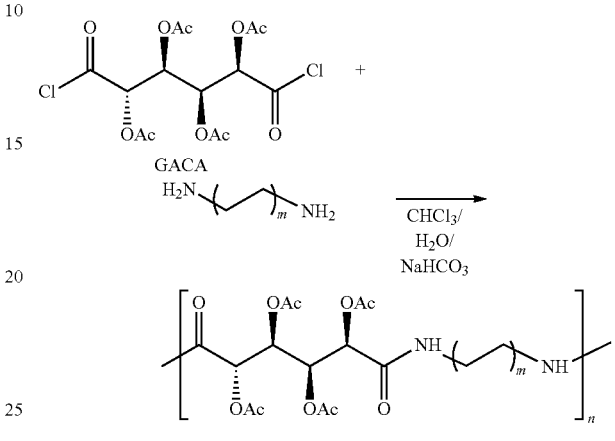

A solution of GACA (ca: 1.0 g, 2.6 mmol) in chloroform (15 ml) was prepared, and an aqueous solution (10 ml) of EA (200 μL, 3.0 mmol) and sodium bicarbonate (0.6 g) was added dropwise to the surface of the chloroform solution. The solution composed of two phases was placed in a flask and all reaction mixtures were recovered by solvent evaporation using a rotary evaporator and subsequently freeze-dried to obtain a crude polyamide. The polymerization product (ca. 600 mg) was purified by dialysis against water using a cellulose dialysis membrane (MWCO=1,000) to obtain a polyamide composed of GAA and EA (4.1 mg).

Other polyamides were synthesized using BA (300 μL, 3 mmol) and HA (400 μL, 3.0 mmol), and the yields of pure polyamides composed of GAA and BA or HA were 1.7 mg and 4.2 mg, respectively.

The $^1$H-NMR spectra of the polyamides obtained in Example 1 are shown in FIG. 1.

The proton peak of FIG. 1 was identified. A broad peak in the range of 5 to 6 ppm is derived from a proton of the glucaric acid main chain, and therefore, suggested that a polymeric product was obtained. In addition, a peak derived from an acetyl group was observed at 2.1 ppm. A peak at 3.4 ppm in FIG. 1(a) was derived from $CH_2$ of EA, peaks at 3.2 and 1.5 ppm in FIG. 1(b) were derived from $CH_2$ of BA, and peaks at 3.2, 1.3, and 1.5 ppm in FIG. 1(c) were derived from $CH_2$ of HA. It can be seen from the measurement of the $^1$H-NMR spectrum that the polymerization reaction of diamine and glucaric acid acetate proceeded.

(4) Measurement of Molecular Weight

Molecular weights of the polymers obtained in Example 1 and Comparative Examples 1 and 2 were determined by GPC (SCL-10A, RID-10A, SIL-10Ai, CTO-10AC, and LC-10Ai, Shimadzu) using 20 mM LiCl/DMAc as a solvent. The GPC curves are shown in FIG. 2.

FIGS. 2(a) and 2(b) show GPC elution curves and molecular weight distributions of polyesters composed of GAA and EO, BO, HO (Comparative Example 1), and FIGS. 2(c) and 2(d) show GPC elution curves and molecular weight distributions of polyamides by solution polymerization, composed of GAA and EA, BA, HA (Comparative Example 2), and FIGS. 2(*e*) and 2(*f*) show GPC elution curves and molecular weight distributions of polyamides by interfacial polymerization, composed of GAA and EA, BA, HA (Example 1).

Among the elution curves in FIG. 2(*e*), the highest molecular weight peak eluted around 14 minutes is derived from the polymer produced. The molecular weight of peak on the low molecular weight side around 16 minutes was about 300, from which it is considered to be a monomer.

The molecular weight of the polymer is shown in Table 1. In the interfacial polymerization with all diamines, it is shown that a compound with a high molecular weight of $14.5 \times 10^3$ to $20.8 \times 10^3$ is produced in the solution.

TABLE 1

| Polymers | Comonomer (m) | Sovent | Catalyst | $M_w$ ($\times 10^3$) | $M_n$ ($\times 10^3$) | $M_w/M_n$ | $T_m$ (° C.) |
|---|---|---|---|---|---|---|---|
| Polyester | EO | 1 | DMAc | TEA | 0.7 | 0.3 | 2.0 | — |
|  | BO | 2 | DMAc | TEA | 0.4 | 0.1 | 2.9 | — |
|  | HO | 3 | DMAc | TEA | 0.7 | 0.3 | 2.8 | — |
| Polyamide | EA | 1 | DMAc | TEA | 7.0 | 3.6 | 1.9 | — |
|  | BA | 2 | DMAc | TEA | 8.0 | 3.9 | 2.0 | — |
|  | HA | 3 | DMAc | TEA | 5.9 | 1.3 | 4.5 | — |
| Polyamide | EA | 1 | $H_2O/CHCl_3$ | $NaHCO_3$ | 20.8 | 8.8 | 2.4 | 119.5 |
|  | BA | 2 | $H_2O/CHCl_3$ | $NaHCO_3$ | 19.6 | 6.9 | 2.8 | 139.4 |
|  | HA | 3 | $h_2O/CHCl_3$ | $NaHCO_3$ | 14.5 | 6.8 | 2.1 | 141.7 |

GAA = 1.0 g, [GAA]/[comonomer] = 1:1

Comparative Example 3

The interfacial polymerization was performed with GACA and EA at the same charging ratio as in Example 1. Sodium bicarbonate aqueous solution of EA was placed in a chloroform solution of GACA and then stirred for three days without using an evaporator. The mixture was separated with water and chloroform, and the organic layer was concentrated and dried. The aqueous layer was freeze-dried. The molecular weight of the product was measured by GPC with chloroform or 20 mM LiCl/DMAc. The weight average molecular weight of the product of the organic layer was 1,300 and the molecular weight of the product of the aqueous layer was about 1,000.

(5) Thermal Characteristics

With respect to the polyamide obtained in Example 1, the sample before dialysis was measured as it is in a mixture.

The TGA curve is shown in FIG. 3. The polyamide was decomposed at 150 to 200° C. It was derived from GAA and the diamine monomer. A residual material in an amount of 40% remaining after heating was salt.

The DSC curve is shown in FIG. 4. The polymerization products with EA, BA, and HA had endothermic peaks observed at 119.5, 139.4, and 141.7° C. Since the melting points of GAA and HA were 50 and 44° C., and EA and BA were a liquid at room temperature, and thus, these peaks indicated the melting points of the product. Therefore, the product was considered to be a crystalline polyamide.

FIG. 5 shows POM images of the polyamide obtained in Example 1. Compared with the starting temperature of 40° C., the polymerization products with EA, BA and HA had a transparent portion by melting at 120° C., 140° C. and 140° C., respectively. The obtained product was thermoplastic.

Example 2

Synthesis of GAA-Based Polyamide by Solution Polymerization

According to Scheme 4 below, solution polymerization of GACA and an aromatic diamine was performed to synthesize a GAA-based polyamide.

Scheme 4: Polymerization of GACA and m-xylenediamine (mXDA)

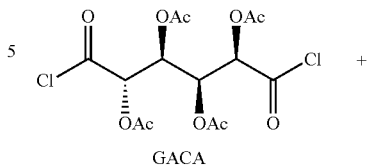

GACA

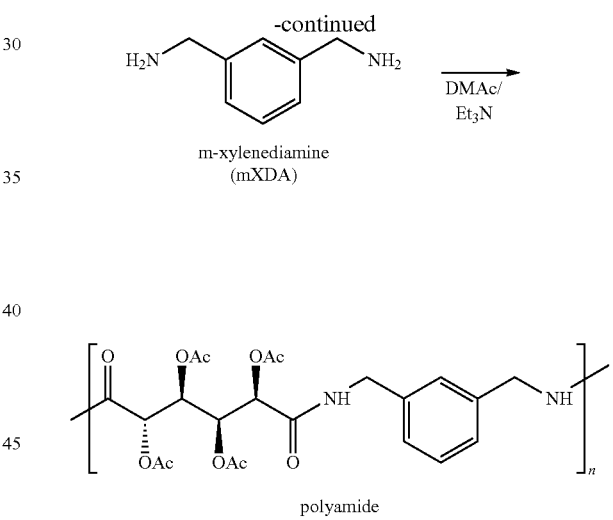

m-xylenediamine (mXDA)

polyamide

A solution of GACA in DMAc (5.0 ml) was added dropwise to a solution of m-xylenediamine (mXDA) and triethylamine ($Et_3N$) in dimethylacetamide (DMAc) (5.0 ml). After stirring the reaction mixture at room temperature overnight, a precipitate was separated by addition of pure water. The precipitate was filtered, washed with pure water, and vacuum dried to obtain a polyamide.

The polymerization conditions such as amounts of GACA, mXDA, $Et_3N$ and DMAc used, and the like, and the molecular weight and yield of the polyamide product are shown in Table 2.

TABLE 2

| No. | GACA (mmol) | mXDA (mmol) | GACA/mXDA (mol/mol) | Et$_3$N (mmol) | DMAc (mL) | Yield (%) | M$_w$ (×10$^3$) | M$_n$ (×10$^3$) | M$_w$/M$_n$ |
|---|---|---|---|---|---|---|---|---|---|
| 1 | 2.6 | 2.6 | 1:1 | 5.2 | 5.0 × 2 | 21.9 | 9.0 | 5.7 | 1.6 |
| 2 | 2.6 | 2.1 | 1:0.8 | 5.2 | 5.0 × 2 | 11.4 | 3.8 | 2.0 | 1.9 |
| 3 | 2.6 | 2.9 | 1:1.1 | 5.2 | 5.0 × 2 | 41.2 | 12.2 | 6.4 | 1.9 |
| 4 | 5.2 | 5.2 | 1:1 | 10.4 | 5.0 × 2 | 56.5 | 12.7 | 6.0 | 1.8 |

As can be seen from Table 2, the molecular weight of the product was higher as a proportion of mXDA was slightly excessive or as the concentration of the monomer in the reaction solution was higher.

The $^1$H-NMR spectra of the polyamides obtained under the polymerization conditions of Nos. 1 and 2 in Table 2 are shown in FIG. 6, and the $^1$H-NMR spectra of the polyamides obtained under the polymerization conditions of Nos. 3 and 4 in Table 2 are shown in FIG. 7. FIGS. 6 and 7 show attribution of the peak, which can confirm the chemical structure of the polyamide product.

The TGA curves and DSC curves of the polyamides obtained under the polymerization conditions of Nos. 1 and 2 in Table 2 are shown in FIGS. 8 and 9.

The TGA curves are shown in FIG. 8. It was found that these polyamides started to decompose around 230° C.

The DSC curves are shown in FIG. 9. The polymerization products obtained under the polymerization conditions of Nos. 1 and 2 in Table 2 had endothermic peaks observed at 149.8° C. and 132.5° C., respectively. These peaks indicated the melting points of the products. Therefore, the products were considered to be crystalline polyamides.

Example 3

Synthesis of GAA-Based Polyamide by Solution Polymerization

According to Scheme 5 below, solution polymerization of GACA and an aromatic diamine was performed to synthesize a GAA-based polyamide.

Scheme 5: Polymerization of GACA and p-xylenediamine (pXDA)

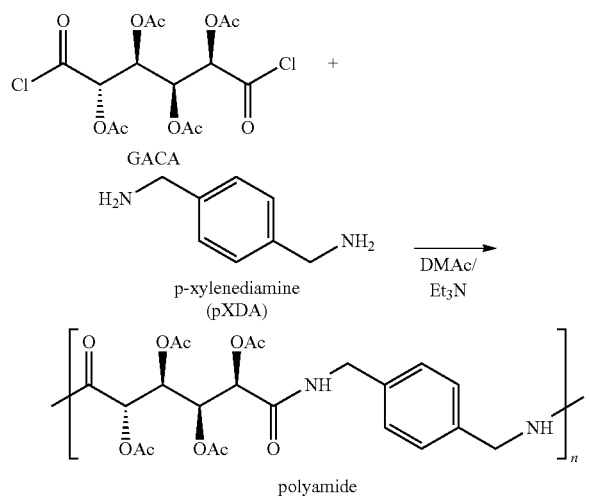

A solution of GACA (2.6 mmol) in DMAc (5.0 ml) was added dropwise to a solution of p-xylenediamine (pXDA, 2.6 mmol) and triethylamine (Et$_3$N, 5.2 mmol) in dimethyl acetamide (DMAc) (5.0 ml). After stirring the reaction mixture at room temperature overnight, a precipitate was separated by addition of pure water. The precipitate was filtered, washed with pure water, and vacuum dried to obtain a polyamide.

The molecular weight of the polyamide product was Mw=7.8×10$^3$, Mn=4.1×10$^3$, Mw/Mn=1.9, and the yield was 45.2%.

The $^1$H-NMR spectrum of the polyamide obtained in Example 3 is shown in FIG. 10. FIG. 10 shows attribution of the peak, which can confirm the chemical structure of the polyamide product.

Example 4

Synthesis of GAA-Based Polyamide by Interfacial Polymerization

According to Scheme 6 below, interfacial polymerization of GACA and an aromatic diamine was performed to synthesize a GAA-based polyamide.

Scheme 6: Polymerization of GACA and m-xylenediamine (mXDA)

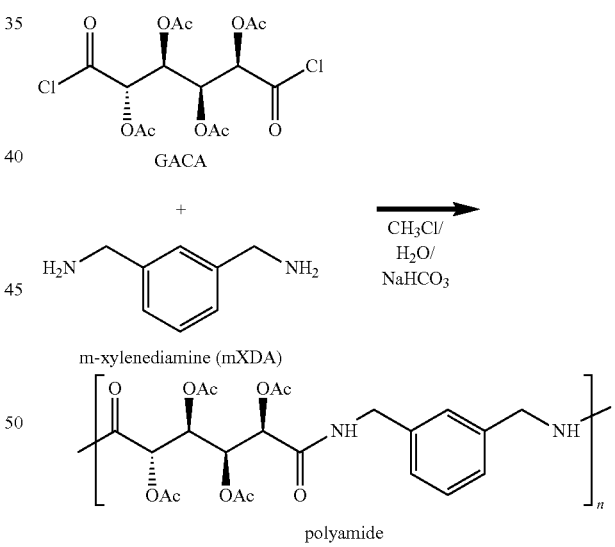

A solution of GACA (2.6 mmol) in chloroform (10 ml) was prepared, and a solution of mXDA (3.0 mmol) and sodium bicarbonate (0.6 g) in water (10 ml) was added dropwise to the surface of the chloroform solution. The solution composed of two phases was placed in a flask and all reaction mixtures were recovered by solvent evaporation using a rotary evaporator and subsequently freeze-dried to obtain a crude polyamide. The polymerization product (ca. 600 mg) was purified by dialysis against water using a cellulose dialysis membrane (MWCO=1000) to obtain a polyamide composed of GAA and mXDA (yield of 572 mg).

The molecular weight of the polyamide product was $Mw=6.6\times10^3$, $Mn=1.6\times10^3$, and $Mw/Mn=4.0$.

The $^1$H-NMR spectrum of the polyamide obtained in Example 4 is shown in FIG. 11. FIG. 11 shows attribution of the peak, which can confirm the chemical structure of the polyamide product.

Further, the TGA curve and the DSC curve of the polyamide obtained in Example 4 are shown in FIG. 12.

The TGA curve is shown on the left of FIG. 12. The polyamide was decomposed at 150 to 200° C.

The DSC curve is shown on the right of FIG. 12. Heat absorption, which is thought to be the melting point derived from GAA, appeared at 50 to 70° C., but no other endothermic peaks were observed. Since the molecular weight is as low as 6000, it is difficult to describe whether the polymer is crystalline or amorphous.

Example 5

Deprotection of GAA-Based Polyamide

According to Scheme 7 below, deprotection of the acetyl group from the GAA-based polyamide was performed to achieve conversion into GA-based polyamide.

Scheme 7: Deprotection of polyamide

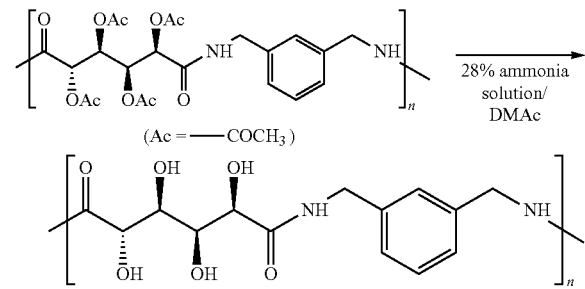

As the GAA-based polyamide, the polyamide obtained under the polymerization conditions of No. 4 in Table 2 described in Example 2 was used.

The GAA-based polyamide (250 mg) was dissolved in DMAc (5.0 mL), 28% aqueous ammonia (1.5 mL, 2.0 mL or 2.5 mL) was added thereto, and the mixture was stirred at room temperature for 24 hours.

When 1.5 mL and 2.5 mL of aqueous ammonia were added, after 24 hours, acetone was added to the reaction mixture to precipitate a polyamide, and the polyamide was recovered. The yield when adding 1.5 mL of ammonia water was 169.0 mg, and the yield when adding 2.5 mL of aqueous ammonia was 138.0 mg.

In addition, when 2.0 mL of aqueous ammonia was added, after 24 hours, 2-propanol was added to the reaction mixture to precipitate a polyamide, and the polyamide was recovered. When 2.0 mL of aqueous ammonia was added, the yield was 87.8 mg.

The $^1$H-NMR spectra of the polyamides obtained in Example 5 are shown in FIG. 13. FIG. 13(a) shows the $^1$H-NMR spectrum of the GAA-based polyamide as a raw material, and FIGS. 13(b), 13(c) and 13(d) each show the $^1$H-NMR spectra of the recovered polyamides obtained when 1.5 mL, 2.0 mL and 2.5 mL of aqueous ammonia were added.

It can been see that the peak derived from the proton of glucaric acid was shifted from a range of 5 to 6 ppm (a) to a range of 3.7 to 4.3 ppm (b, c, and d), and thus the deprotection was performed. When 2.5 mL of aqueous ammonia was added, the peak of OH was broad as compared with others, indicating that deprotection progresses well. Further, when acetone was used for the precipitation, the purity of the recovered product was low, whereas in the precipitation using 2-propanol, the purity of the recovered product was high.

The invention claimed is:

1. A thermoplastic polymer comprising at least one repeating unit derived from an aldaric acid and at least one repeating unit derived from an aromatic diamine, wherein the thermoplastic polymer has a weight average molecular weight of 20,000 or more.

2. The thermoplastic polymer according to claim 1, further comprising at least one repeating unit derived from a diamine or a diol.

3. The thermoplastic polymer according to claim 1, wherein the aldaric acid is selected from the group consisting of xylaric acid, arabinaric acid, glucaric acid, mannaric acid, and galactaric acid.

4. The thermoplastic polymer according to claim 1, wherein the thermoplastic polymer has crystallinity.

5. The thermoplastic polymer according to claim 2, wherein the aldaric acid is selected from the group consisting of xylaric acid, arabinaric acid, glucaric acid, mannaric acid, and galactaric acid.

6. The thermoplastic polymer according to claim 2, wherein the thermoplastic polymer has crystallinity.

7. The thermoplastic polymer according to claim 3, wherein the thermoplastic polymer has crystallinity.

8. The thermoplastic polymer according to claim 5, wherein the thermoplastic polymer has crystallinity.

* * * * *